Aug. 30, 1966  R. W. ANSELL  3,269,409
CHECK VALVE FOR USE WITH A MASTER CYLINDER
Filed Nov. 21, 1963
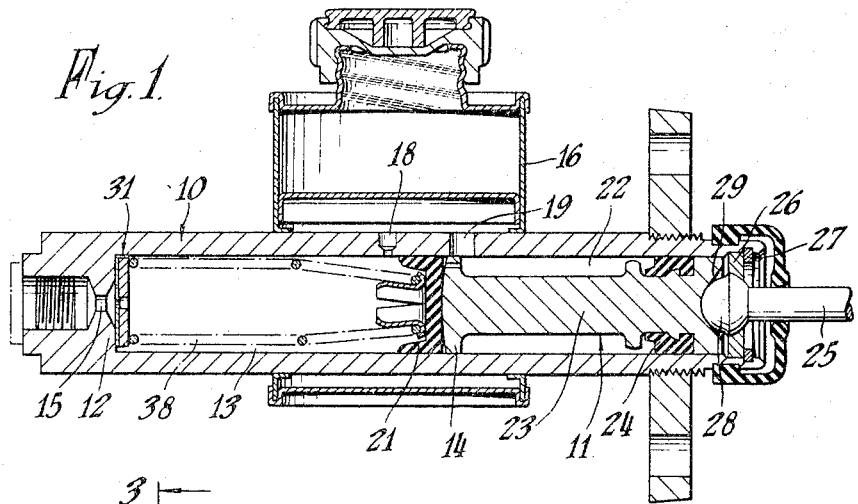
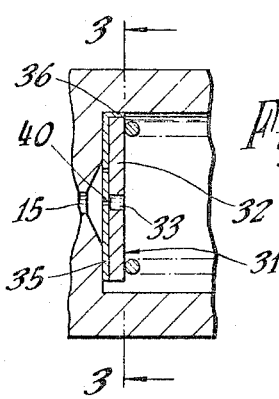
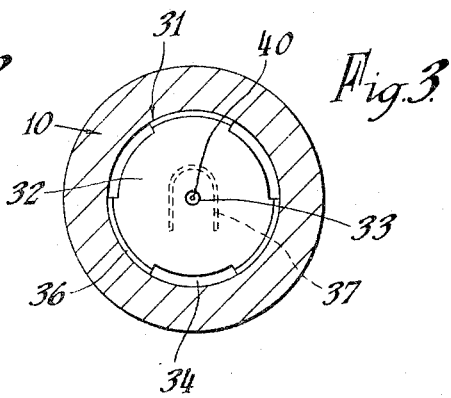
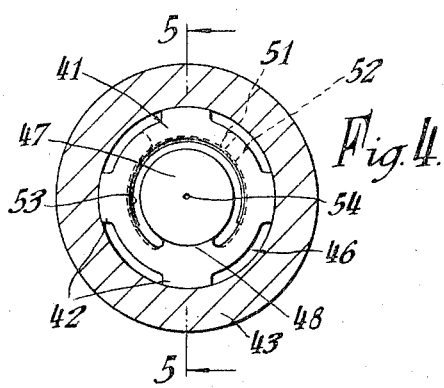
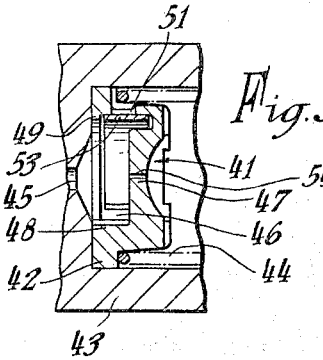
INVENTOR
Ronald William Ansell
BY Winter, Fay, Adams &
Tockman ATTORNEYS

United States Patent Office 3,269,409
Patented August 30, 1966

3,269,409
CHECK VALVE FOR USE WITH A
MASTER CYLINDER
Ronald William Ansell, Leamington Spa, England, assignor to Automotive Products Company Limited, Leamington Spa, England
Filed Nov. 21, 1963, Ser. No. 325,356
Claims priority, application Great Britain, Dec. 21, 1962, 47,577/62
5 Claims. (Cl. 137—525)

This invention relates to master cylinders for liquid pressure control systems, and has for its object to provide an improved form of valve for controlling the flow of liquid between the master cylinder and the conduit connecting it to the motor cylinders operated by it.

It has been the usual practice, especially in master cylinders for liquid pressure braking systems on vehicles, to provide a valve which, whilst it allows liquid to pass freely from the master cylinder into the conduit, resists free return flow, thereby ensuring that pressure built up in the system is relieved relatively slowly.

Many different forms of valve have been provided for this purpose.

According to the present invention, in a liquid pressure master cylinder including a valve to control the flow of liquid through a pressure outlet therefrom, the said valve comprises a body member adapted to make sealing engagement with a seat around said pressure outlet, a spring acting on said valve body member to effect such sealing engagement, said body member being formed with an aperture and a blade-like member being provided to control the said aperture, the blade-like member being resiliently urged against a surface of the valve body member, exposed to said outlet passage, in which said aperture opens, so that it is displaced by liquid flowing out of the master cylinder through said passage.

The blade may comprise a tongue formed in a resilient metal disc engaging an end surface of the valve body member and controlling an axial hole in said body member.

Alternatively, the surface against which the blade-like member is urged may be a concave arcuate surface of a substantially cylindrical recess, the blade-like member being an interrupted resilient ring lying against the said surface so as to cover said aperture.

The invention is hereinafter described with reference to the accompanying drawings in which:

FIGURE 1 is a sectional elevation of one form of liquid pressure master cylinder embodying the invention;
FIGURE 2 is a view on a larger scale corresponding to a part of FIGURE 1;
FIGURE 3 is a section on the line 3—3 of FIGURE 2;
FIGURE 4 is an end elevation of a modified form of valve for use in the master cylinder shown in FIGURE 1; and
FIGURE 5 is a section on the line 5—5 of FIGURE 4.

Referring to FIGURES 1 to 3 of the drawings, the master cylinder comprises a tubular barrel 10 in which is slidable a piston 11. The barrel 10 is closed at its end 12 to provide a pressure chamber 13 between said closed end and the head 14 of the piston, and outlet orifice 15 in the said closed end providing for the connection to the said pressure chamber of conduits (not shown) leading to motor cylinders or other devices to be operated by the pressure generated in the master cylinder.

A cylindrical sheet metal reservoir 16 is provided to contain a reserve of liquid, the master cylinder barrel 10 passing diametrically through the reservoir 16. Ports 18 and 19 in the barrel 10 open into the reservoir 16, the said ports being so positioned that, when the piston is in the retracted position shown in FIGURE 1 a cup packing 21 on the head 14 thereof lies between the two ports.

The port 18, which is of restricted cross-sectional area, opens into the pressure chamber 13, and the port 19, which is of substantially greater cross-sectional area, opens into an annular space 22 around a waist 23 in the piston, leakage of liquid from the rear end of the said annular space being prevented by a packing 94. The piston 11 is operated by a push rod 25 passing through an aperture in an end plate 26 closing the rear end of the master cylinder barrel and held in position by a clip ring 27, the push rod 25 having a head 28 formed with part spherical surfaces which engage in a depression 29 in the piston and on a correspondingly part spherical surface on the end plate 26 respectively. The push rod is coupled in any suitable manner to a pedal or other convenient operating member.

A valve 31 is provided to control the flow of liquid through the outlet orifice 15, the said valve comprising a disc-shaped body 32, conveniently formed of a relatively hard synthetic resinous material such as nylon, or of metal. The disc-shaped body 32 has a central aperture 33 and is cut away at its edge, as shown at 34 in FIGURE 3 so that it is guided for sliding movement in the barrel 10 but permits liquid to pass around its edge. Between the body 32 and the end 12 of the master cylinder is mounted a disc 35 of resilient metal, cut away at its edge to correspond to the shape of the body 32 and having an interrupted cylindrical rim 36 which surrounds the valve body 32. The disc 35 is cut to provide a tongue 37, FIGURE 3, which constitutes a blade-like member and lies over the aperture 33 and within the perimeter of a countersunk end of the outlet orifice 15.

A coiled compression spring 38 mounted between the cup packing 21 and the valve body 32 provides a retracting load on the piston 11 and also urges the valve body 32 against the end 12 of the cylinder barrel. A very small hole 40 is formed in the disc 35 co-axially with the aperture 33.

When the piston 11 is moved towards the end 12 of the barrel to create pressure in the pressure chamber 13, liquid flows freely through the aperture 33, deflecting the tongue 37 away from the face of the valve body 32 so that the said tongue does not restrict the flow. When the piston 11 is allowed to return, however, liquid being forced back into the working chamber by return springs or the like acting on the pistons of motor cylinders in which the liquid pressure is utilized urges the tongue 37 against the face of the valve body 32 so as to close the aperture 33, and such liquid, to enter the chamber 13, must flow through the hole 40 or displace the valve body 32 away from the end 12 of the master cylinder barrel. In fact, the valve body 32 is displaced initially and remains displaced until the pressure falls sufficiently to allow the spring 38 to seat it, final equalisation of pressure taking place through the hole 40. Consequently, the return of liquid to the pressure chamber is retarded and the pressure in the system is dissipated gradually, and if due to bad adjustment of the brakes or loss of liquid the stroke of the pedal is insufficient to apply the brakes, the pedal can be pumped to force more liquid into the system.

FIGURES 4 and 5 show a modified form of valve for controlling the master cylinder outlet orifice. As in the previously described example, the valve body 41 is generally disc-shaped. It has an interrupted flange 42 to guide it in the master cylinder barrel 43 and to provide an abutment for a coiled compression spring 44 acting to urge it to seat around the outlet orifice 45 of the master cylinder barrel. The spring 44 also serves as the return spring for the master cylinder piston (not shown). The valve body 41 has a recess 46 in its forward face which is generally of cylindrical form but has a central boss 47 standing out from its inner end and a radial rib 48 which joins the boss 47 to the peripheral wall of the recess. An orifice 51 (FIGURE 5) is formed in the peripheral wall of the recess 46, connecting the said recess to the other side of the valve body.

A blade-like member in the form of an arcuate band 53 of resilient metal is mounted in the recess 46 so as to lie against the peripheral wall thereof and the said blade-like member normally tends to close the orifice 51, being pressed, due to its resilience, against the wall of the recess. The band 53 is held against rotation, and its displacement away from the orifices is limited, by the rib 48. A small hole 54 in the centre of the body 41 performs the same function as the hole 40 in the valve body shown in FIGURE 1.

As in the previous example, the blade-like member is urged against the peripheral surface of the recess by liquid returning into the master cylinder, so that such liquid can enter the master cylinder only so long as its pressure is sufficient to compress the spring 44 and move the valve body 41 away from the end of the cylinder. Outward flow of liquid, however, displaces the blade-like member away from the peripheral wall of the recess and allows the liquid to flow through the orifice 51, the blade-like member offering no appreciable resistance to the flow.

The provision of an aperture in the peripheral wall of the recess in the valve body 41 causes the liquid to tend to flow in a circular path around the valve body, thus facilitating the scavenging of air from the master cylinder.

I claim:

1. A valve for use with a master cylinder and the like comprising a cylindrical member with a boss forming a central recess adjacent one end thereof, a radially extending liquid passage disposed in the peripheral wall of said cylindrical member in communication with the outer periphery of said member and the interior of said recess, said boss having a semi-circular slot disposed therein forming a peripheral wall, a semi-circular resilient valve blade mounted in said slot means and covering said radial passage, whereby flow of liquid into said recess keeps said passage covered and flow of liquid in said passage unseats said valve.

2. The valve of claim 1 wherein said cylindrical member is substantially cup-shaped and has an outwardly extending annular rim around its end adjacent said recess.

3. The valve of claim 2 wherein said boss has a concave recess in its outer surface and a small aperture therein in communication with said central and concave recesses.

4. The valve of claim 3 wherein the outer circumference of said rim is provided with spaced slots therein.

5. A valve for use with a master cylinder and the like comprising a hollow cylindrical valve body having a central boss closing off one end of the valve body and forming a central longitudinal recess with said boss, an annular seating surface formed on said valve body opposite said boss, a radial passage extending through said valve body between said boss and annular surface in communication with the circumference of said valve body and said central recess, said boss having a semi-circular recess therein forming a peripheral wall, a resilient arcuate blade member mounted in said semi-circular recess and disposed to normally close off said radial passage to prevent liquid flow therethrough, a radial rib on said valve body disposed between the ends of said semi-circular recess to prevent rotation of said blade member from a position covering said passage, said blade member being deformed inwardly against said peripheral wall to permit flow through said passage.

References Cited by the Examiner

UNITED STATES PATENTS

| | | | |
|---|---|---|---|
| 894,286 | 7/1908 | Reineking | 137—525 X |
| 1,265,153 | 5/1918 | Winsor | 137—525 |
| 1,985,936 | 1/1935 | Loweke | 137—493.2 X |
| 2,133,575 | 10/1938 | Rosenberg | 137—493.2 X |
| 2,161,642 | 6/1939 | Stroup | 137—493.6 X |
| 2,214,045 | 9/1940 | Dick et al. | 60—54.6 X |
| 2,722,103 | 11/1955 | Erickson | 60—54.6 |
| 2,816,571 | 12/1957 | Pike | 137—493.6 |
| 2,827,918 | 3/1958 | Fisher | 137—493.8 |
| 2,942,423 | 6/1960 | Brand | 60—54.6 |
| 2,954,675 | 10/1960 | Reynolds | 60—54.6 |

FOREIGN PATENTS 862,567   1/1953   Germany.

MARTIN P. SCHWADRON, *Primary Examiner.*

EDGAR W. GEOGHEGAN, M. CARY NELSON,
*Examiners.*

A. ROSEN, *Assistant Examiner.*